July 20, 1971
N. C. SJÖBERG
3,594,248
METHOD OF MANUFACTURING TIRES HAVING AN ANNULAR PATTERNED
COLORED BAND ON THE TIRE SIDEWALL
Filed March 18, 1968
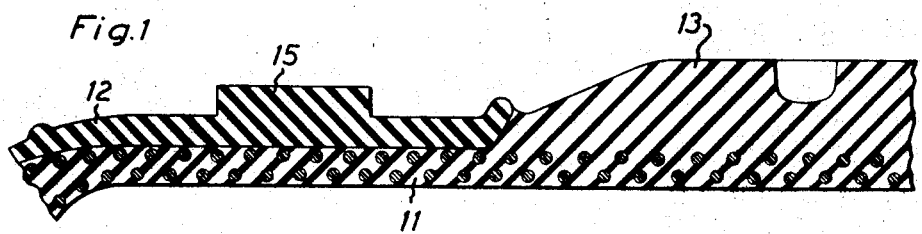
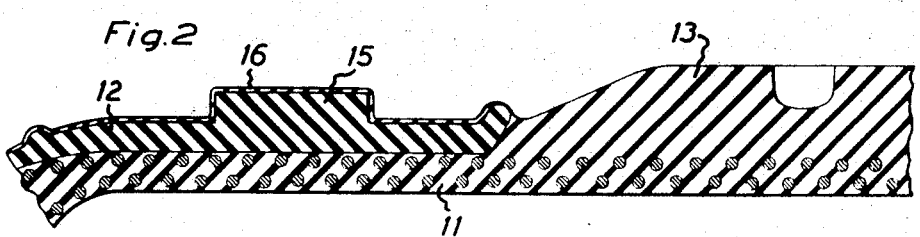
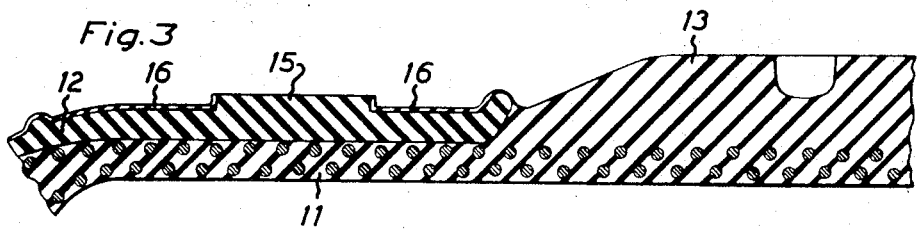
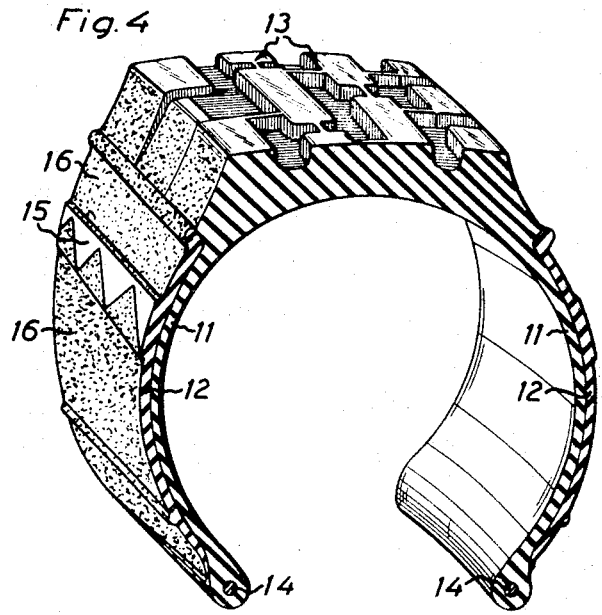
INVENTOR:
NILS CRONJE SJÖBERG
by
Browne, Schuyler & Beveridge,
Attorneys United States Patent Office 3,594,248
Patented July 20, 1971

3,594,248
METHOD OF MANUFACTURING TIRES HAVING AN ANNULAR PATTERNED COLORED BAND ON THE TIRE SIDEWALL
Nils Cronje Sjoberg, Trelleborg, Sweden, assignor to Trelleborgs Gummifabriks Aktiebolag, Trelleborg, Sweden
Filed Mar. 18, 1968, Ser. No. 713,797
Claims priority, application Sweden, Mar. 23, 1967, 4,099/67
Int. Cl. B29h 21/02
U.S. Cl. 156—116                                    3 Claims

ABSTRACT OF THE DISCLOSURE

A method of manufacturing a light-duty tire in which a colored rubber inlay is inserted into the tire at the building of the green tire, the rubber inlay being provided at the vulcanization with a pattern corresponding to the desired tire sidewall decoration in the form of elevated portions with steep sides, whereupon the entire free surface of the rubber inlay after vulcanization and removal of the tire from the vulcanizing mold is coated with a self-vulcanizing rubber solution of substantially the same color as the remaining portions of the tire, and finally, after self-vulcanization of the rubber solution, the desired tire sidewall decoration is made visible by grinding away the self-vulcanized rubber on the elevated portions of the pattern.

---

Various methods have been suggested to provide tires with white sidewalls, usually in the form of an annular color effect band on the tire side wall. Mostly, this annular band is of the same uniform width all around the tire. For further decoration of the tire sidewalls it has been desired to provide other types of patterns which are concentrical with the tire. For instance, such patterns may have the form of small triangles or small circles or other small partial patterns in side-by-side relationship. However, from technical viewpoints it is difficult to attain such patterns by building up the tire from rubber types of different colors. If a colored inlay conforming to the pattern is inserted in the green tire before vulcanization thereof, this colored inlay will change its form altogether when the rubber flows prior to and during vulcanization thereof in the vulcanizing mold. Another drawback of inserting an inlay in the green tire is that the shaping of inlays of a predetermined form in a rubber detail is expensive.

In an attempt at appreciably overcoming the drawbacks inherent in the abovementioned prior-art processes one has inserted in the green tire an inlay (cf. French Pat. 1,446,772) of the color desired for the pattern, and on top of said inlay one then placed a rubber layer of the same color as that of the remaining tire portions. At the vulcanization of this green tire, elevated portions conforming to the pattern were provided within the area of the colored rubber inlay. After vulcanization grinding was effected to have the colored rubber appear in the elevated portions. This procedure, however, does not always give the desired decoration since the flowing of the colored rubber in the elevated portions will mostly be irregular whereby the pattern in turn becomes irregular at the grinding.

The object of the present invention is to provide a method of manufacturing a light-duty tire of the group consisting of industrial, motor-cycle, scooter, bicycle and moped tires having a patterned colored sidewall decoration, wherein the resulting pattern will always be regular and cannot be affected by non-uniform flow during vulcanization in the vulcanizing mold. The invention thus relates to a method of manufacturing a tire having an annular patterned colored band on the tire sidewall, comprising the steps of building a green tire, inserting into the green tire at the building thereof a rubber inlay which is of a color different from that of the other parts of the tire and which with a surface portion extending concentrically around the tire sidewall forms the surface of the green tire, and vulcanizing the finished green tire in a vulcanizing mold from which the vulcanized tire is removed. The method of the present invention is characterized by providing said surface portion of the rubber inlay at the vulcanization with a pattern corresponding to the desired sidewall decoration and being in the form of elevated portions with steep sides, coating the entire free surface of the rubber inlay after the vulcanization and removal of the tire from the vulcanizing mold with a self-vulcanizing rubber solution of the same or substantially the same color as said remaining portions of the tire, and, after the vulcanization of the self-vulcanizing rubber solution, making the desired sidewall decoration visible by grinding away the vulcanized rubber solution on the elevated portions of the pattern.

When the tire is black and shall be provided with a tire sidewall decoration of deviating color, such as red color, the free surface of the rubber inlay is coated after vulcanization and removal of the tire from the vulcanizing mold preferably with a black self-vulcanizing rubber solution based on chloroprene rubber and a rubber from the group of natural rubber, isoprene rubber and styrene butadiene rubber.

The invention will be elucidated by way of some examples in the following.

EXAMPLE 1

A black bicycle tire having a patterned red sidewall decoration in the form of small triangles disposed side by side concentrically with the tire sidewall was manufactured by the conventional methods, i.e. by first applying on a cord fabric a red rubber layer of the composition indicated hereinafter, and then mounting a black tread of the composition indicated hereinafter. The resulting green tire was vulcanized in a vulcanizing mold having triangular depressions conforming to the desired pattern, having a depth of 0.5 mm. and steep sides and being placed concentrically around the tire on a level with the tire sidewalls. After vulcanization and removal of the tire from the vulcanizing mold the red portions of the tire were coated with a self-vulcanizing rubber solution which had the composition indicated hereinafter and substantially the same color (black) as the tread of the tire.

BLACK TREAD

| | Parts by weight |
|---|---|
| Natural rubber | 100 |
| Furnace black (HAF-black) | 74 |
| Chalk | 9 |
| Zinc oxide | 3.7 |
| Sulfur | 2.5 |
| Santocure® (N - cyclohexyl - 2 - benzotiazole sulfenamide) | 1 |
| Coumarone resin | 9 |
| Stearic acid | 1 |

RED RUBBER

| | Parts by weight |
|---|---|
| Natural rubber | 100 |
| Chalk | 302 |
| Zinc oxide | 3 |
| Sulfur | 1.2 |
| Tetramethylthiuram disulfide | 0.7 |
| Santocure® | 0.2 |
| Red dye ("Vulcafor Red AS" manufactured by Imperial Chemical Industries Ltd., London, England) | 1.25 |
| Stearic acid | 1.0 |

BLACK PAINT

| | Parts by weight |
|---|---|
| Chloroprene rubber | 50 |
| Natural rubber | 50 |
| Zinc oxide | 5 |
| Magnesium oxide | 2 |
| Sodium acetate | 1 |
| Dibenzothiazyl disulfide | 1 |
| Mercaptoimidazoline | 0.5 |
| Spinning oil (mineral oil) | 5 |
| Channel black (MPC-black) | 25 |
| JET-black (manufactured by B. F. Goodrich Chemical Co., U.S.A. | 98 |
| Solvent | Q.S. |

In the above red rubber recipe, isoprene rubber or styrene butadiene rubber can be substituted for natural rubber. The red rubber composition in addition comprises conventional antioxidants and compounding aids.

The black paint was dissolved in a sufficient amount of an aromatic solvent, e.g. toluene, in order that the solution should have suitable viscosity in use.

After the self-vulcanizing rubber solution had been applied and had self-vulcanized the black rubber layer formed by the rubber solution was ground away from the crests of the triangular depressions so that the underlying red rubber was exposed. The red triangles formed had straight distinct boundary edges and the triangles were uniform all around the tire.

EXAMPLE 2

A black moped tire with a white sidewall decoration was manufactured in the manner described in Example 1, but a white rubber layer of the composition indicated hereinafter was substituted for the red rubber layer. The sidewall decoration had the form of small circular white surfaces which contacted each other and extended as a concentric ring around the two sides of the tire. After the vulcanization of the green tire the white rubber was coated with a black rubber solution of the composition indicated in Example 1, and after the rubber solution had self-vulcanized the circular pattern crests were ground away to expose the underlying white rubber. Also in this case the white circles had distinct uniform boundary edges.

WHITE RUBBER

| | Parts by weight |
|---|---|
| Natural rubber | 100 |
| Kaolin | 64 |
| Titanium dioxide | 53 |
| Zinc oxide | 16 |
| Coumarone resin | 13 |
| Spinning oil (mineral oil) | 6 |
| Sulfur | 2.4 |
| Mercaptobenzothiazole | 0.5 |
| Tetramethylthiuram monosulfide | 0.2 |
| Diphenylguanidine | 0.35 |
| Stearic acid | 1 |

The invention is illustrated more in detail in the accompanying drawing.

FIG. 1 is a section of part of a tire made in accordance with the present invention, after one stage of the manufacture;

FIG. 2 is a section of the same tire as in FIG. 1, but after another manufacturing step;

FIG. 3 is a section of the same tire as in FIGS. 1 and 2 but after the last stage of the manufacturing process;

FIG. 4 is a perspective view of part of a tire manufactured in accordance with the present invention.

FIG. 1 shows a light-duty tire, e.g. a bicycle tire, after the build-up and vulcanization thereof, the tire comprising a carcass 11, a colored inlay 12 of rubber of e.g. white color, a tread 13 of rubber having an other color, e.g. black color, and a bead wire 14 (shown in FIG. 4). At the vulcanization the inlay 12 of the tire at points between its edges has been provided with elevated portions 15 having steep sides. These elevated portions 15 may be triangular as shown in FIG. 4 but they can also be circular or have any other desired configuration.

FIG. 2 shows how the tire after the vulcanization thereof has been coated with a self-vulcanizing rubber solution to form a self-vulcanized rubber layer 16 over the entire colored inlay 12. After the rubber solution has passed over into the vulcanized state, the rubber layer 16 and a small portion of the rubber inlay 12 within the elevated portions 15 are ground away so that the inlay will be exposed within the elevated portions 15. In this way, the boundary lines between the color of the inlay and the color of the other portions of the tire will be absolutely sharp and without any irregularities.

What I claim and desire to secure by Letters Patent is:

1. A method of manufacturing a light duty tire having a patterned colored band on the tire sidewall, comprising the steps of building a green tire, inserting into the green tire at the building thereof a rubber inlay, said rubber inlay being of a color different from that of the other parts of the tire, forming a surface portion of the tire sidewall by means of the rubber inlay, said surface portion extending concentrically with the tire sidewall, vulcanizing the finished green tire in a vulcanizing mold, providing said surface portion of the tire sidewall at the vulcanization of the green tire with a pattern corresponding to the desired sidewall decoration, said pattern being in the form of elevated portions with steep sides, removing the vulcanized tire from the vulcanizing mold, coating the said surface portion of the tire sidewall after the vulcanization and removal of the tire from the vulcanizing mold with a self-vulcanizing rubber solution, said slef-vulcanizing rubber solution being based on chloroprene rubber and natural rubber, said rubber solution being of substantially the same color as said other parts of the tire, allowing enough time to elapse for the self-vulcanizing of the rubber solution to form a coating of self-vulcanized rubber and, after the vulcanizing of the self-vulcanizing rubber solution, grinding away the self-vulcanized rubber coating on the elevated portions of the pattern to make the desired sidewall decoration visible.

2. The method of claim 1 performed at the manufacture of a black tire having a sidewall decoration of different color, comprising coating said surface portion of the tire sidewall after the vulcanization and removal of the tire from the vulcanizing mold with a black self-vulcanizing rubber solution based on chloroprene rubber and isoprene rubber.

3. The method of claim 1 performed at the manufacture of a black tire having a sidewall decoration of different color, comprising coating said surface portion of the tire sidewall after the vulcanization and removal of the tire from the vulcanizing mold with a black self-vulcanizing rubber solution based on chloroprene rubber and styrene butadiene rubber.

References Cited

UNITED STATES PATENTS

| | | | |
|---|---|---|---|
| 1,741,997 | 12/1929 | Learch | 152—353 |
| 1,895,088 | 1/1933 | Taylor | 152—353 |
| 1,989,676 | 2/1935 | Bodle | 152—353 |
| 1,989,703 | 2/1935 | Leguillon | 152—353 |
| 3,377,222 | 4/1968 | Dean | 156—116 |
| 3,443,619 | 5/1969 | Kindle | 152—353 |

FOREIGN PATENTS

| | | | |
|---|---|---|---|
| 698,710 | 11/1964 | Canada | 156—116 |

SAMUEL W. ENGLE, Primary Examiner

R. E. HART, Assistant Examiner